(12) United States Patent
Machida et al.

(10) Patent No.: US 7,035,406 B2
(45) Date of Patent: Apr. 25, 2006

(54) SIGNATURE AUTHENTICATING APPARATUS, SIGNATURE AUTHENTICATING METHOD, SIGNATURE AUTHENTICATING PROGRAM, AND STORAGE MEDIUM STORING SIGNATURE AUTHENTICATING PROGRAM

(75) Inventors: Hatsuo Machida, Kanagawa (JP); Hiroto Yoshii, Tokyo (JP); Masaru Okazaki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 809 days.

(21) Appl. No.: 09/865,451

(22) Filed: May 29, 2001

(65) Prior Publication Data

US 2001/0048743 A1    Dec. 6, 2001

(30) Foreign Application Priority Data

May 30, 2000   (JP)   .............................. 2000-160205

(51) Int. Cl.
*G06F 17/00* (2006.01)
(52) U.S. Cl. .................... 380/30; 382/186; 382/187; 713/176
(58) Field of Classification Search ........... 713/200, 713/202, 176; 380/30; 382/186, 187
See application file for complete search history.

(56) References Cited

U.S. PATENT DOCUMENTS 5,606,663 A * 2/1997 Kadooka .................... 713/202

6,496,937 B1 * 12/2002 Ichihara ..................... 713/202

OTHER PUBLICATIONS

"Digital Unix Security" Sections 1,2,6, and 9, Mar. 1996, [Retrieved from Internet Nov. 29, 2004], http://www.henderson.edu/documentation/AQ0R2DTE/TOC.HTM.*
Trace copy forgery detection for handwritten signature verification; Deng et al.; Security Technology, 2003. Proceedings. IEEE 37th Annual 2003 International Carnahan Conference on Oct. 14-16, 2003 pp. 450-455.*
Digital technique to analyze handwritten signatures; Dhar et al.; Security Technology, 1988. Crime Countermeasures, Proceedings. IEEE 1988 International Carnahan Conference on Oct. 5-7, 1988 pp. 9-13.*
The handwritten signature in pen computing; Smithies, C.P.K.; Handwriting and Pen-Based Input, IEE Colloquium on 1994 pp. 2/1-2/3.*
U.S. Appl. No. 09/722,703, filed Nov. 28, 2000.

* cited by examiner

*Primary Examiner*—David Jung
(74) *Attorney, Agent, or Firm*—Fitzpatrick, Cella, Harper & Scinto

(57) ABSTRACT

An entered signature is compared with registered signature data to calculate an evaluation value, and when the evaluation value for the entered signature is within the allowable range for successful authentication, it is determined whether aging has occurred. When aging is determined to have occurred, a warning message is displayed to urge re-registration of the signature. According to such a configuration, it is possible, when a change in signature is caused by aging, to avoid circumstances in which authentication becomes suddenly impossible.

46 Claims, 13 Drawing Sheets

FIG. 3

| DATE | EVALUATION VALUE |
|---|---|
| 2000/1/1 | 0 |
| 2000/1/5 | 200 |
| 2000/1/7 | 210 |
| 2000/1/8 | 180 |
| 2000/1/9 | 250 |
| 2000/1/20 | 300 |
| 2000/1/23 | 230 |
| 2000/1/25 | 400 |
| 2000/1/30 | 450 |

SIGNATURE AUTHENTICATING APPARATUS, SIGNATURE AUTHENTICATING METHOD, SIGNATURE AUTHENTICATING PROGRAM, AND STORAGE MEDIUM STORING SIGNATURE AUTHENTICATING PROGRAM

BACKGROUND OF THE INVENTION

1. Field of the Invention

The present invention relates to a signature authenticating apparatus, a signature authenticating method, and a signature authenticating program for entering a handwritten signature and determining whether or not the signer is the person in question, and to a storage medium storing the signature authenticating program.

2. Description of the Related Art

It is a long-established practice for identifying a person to use a handwritten signature given by the person in question and to confirm the same through visual inspection. More recently, as an alternative to identifying means based on a password on a computer, a technique of identifying a person by authenticating a handwritten-entered signature by use of a computer has been conceived.

The concept of authenticating a handwritten signature by use of a computer comprises the steps of electrically converting time coordinates and writing pressure into machine-readable data by entering the signature into a digitizer, comparing the same with registered signature data of that person previously registered in a dictionary (signature data recording section), calculating an evaluation value representing the difference between the entered signature and the registered signature data registered in the dictionary, and determining whether or not the signer is that person in question depending upon whether or not this evaluation value is over a predetermined threshold value.

SUMMARY OF THE INVENTION

However, even in the form of a signature, a personal holograph (i.e., signature) tends to change little by little over time. Accordingly, as the difference between the entered signature and the registered signature data registered in the dictionary (signature data recording section) becomes larger, there is a higher possibility that even a signature given by the very person in question is determined to be a failed authentication.

Therefore, the present invention has an object to permit coping with the aging of the user's holograph.

The invention is based on a process comprising the steps of previously storing registered signature data used for signature authentication in signature data storage means, comparing signature data entered upon signature authentication with the registered signature data stored in the signature data storage means to calculate an evaluation value, determining whether or not authentication is successful authentication, and determining whether or not aging of the registered signature data has occurred on the basis of the thus calculated evaluation value. When aging is determined to have occurred, a warning message is displayed to call upon the user to re-register the signature data. A determination of whether or not aging has occurred is made when signature authentication is successful.

According to the invention, therefore, it is possible to prevent the occurrence of sudden unexpected impossibility of authentication when the signature changes due to aging.

By correcting the registered signature at certain time intervals, it is possible to prevent a decrease in reliability of authentication identifying a person.

Even in signature authentication in a client-server system, it is possible to cope with aging.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 illustrates a data list prepared by the aging determining section;

DESCRIPTION OF THE PREFERRED EMBODIMENTS

First Preferred Embodiment

Figure 12:
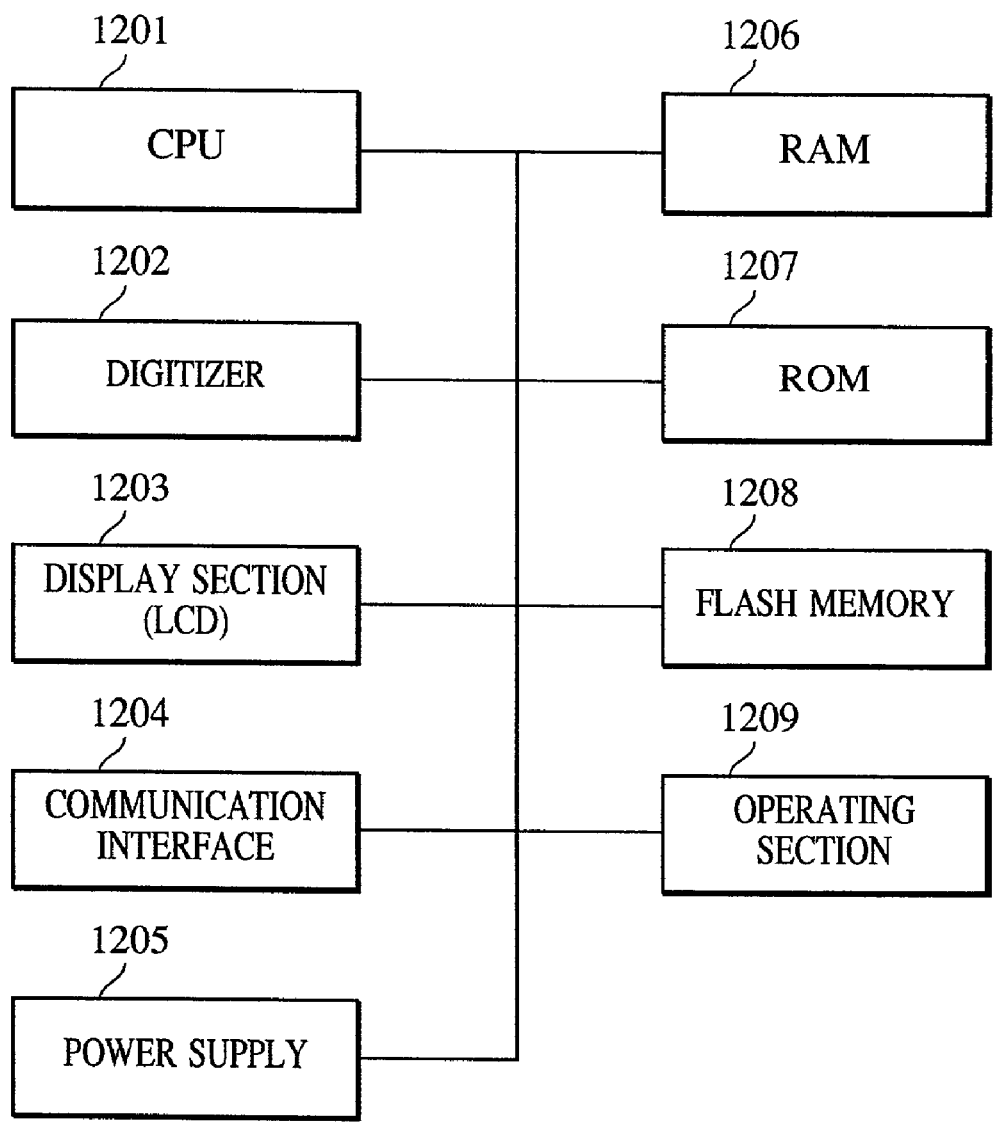
FIG. 12 is the internal configuration diagram of a signature authenticating apparatus.

The signature authenticating apparatus of this embodiment is applicable to information processing units such as a portable information terminal having a digitizer. FIG. 12 illustrates the internal configuration of the signature authenticating apparatus of this embodiment. In FIG. 12, a CPU 1201 reads out a program such as a signature authenticating program or an application software program from a ROM 1207 or a flash memory 1208, and executes processing corresponding to the program by use of a RAM 1206 serving as a work area. In this embodiment, the program such as the signature authenticating program or an application software program is read out from the ROM 1207 or the flash memory 1208. However, a detachable external storage medium such as a floppy disk, a CD-ROM, an MO(Magnet Optical Disk), or a CD-R may store programs, and this external storage medium may be mounted in the signature authenticating apparatus so that the program is read out from the external storage medium and executed. A digitizer 1202 receives input of handwritten holographic data such as a signature. A display section 1203 conducts control so as to display the entered information or the like on a liquid crystal display. A communication interface 1204 is used for communication with external equipment. The present invention can be implemented in such a manner that a program constituting the invention is distributed through a communication network, and the CPU executes a program distributed through a network such as the Internet. A power supply 1205 feeds these devices with power. The RAM 1206 serves as a work area used when the CPU 1201 executes a program. The ROM 1207 and the flash memory 1208 are storage media storing programs and data. An operating section 1209 receives input from other buttons and the like provided on the signature authenticating apparatus.

Figure 1:
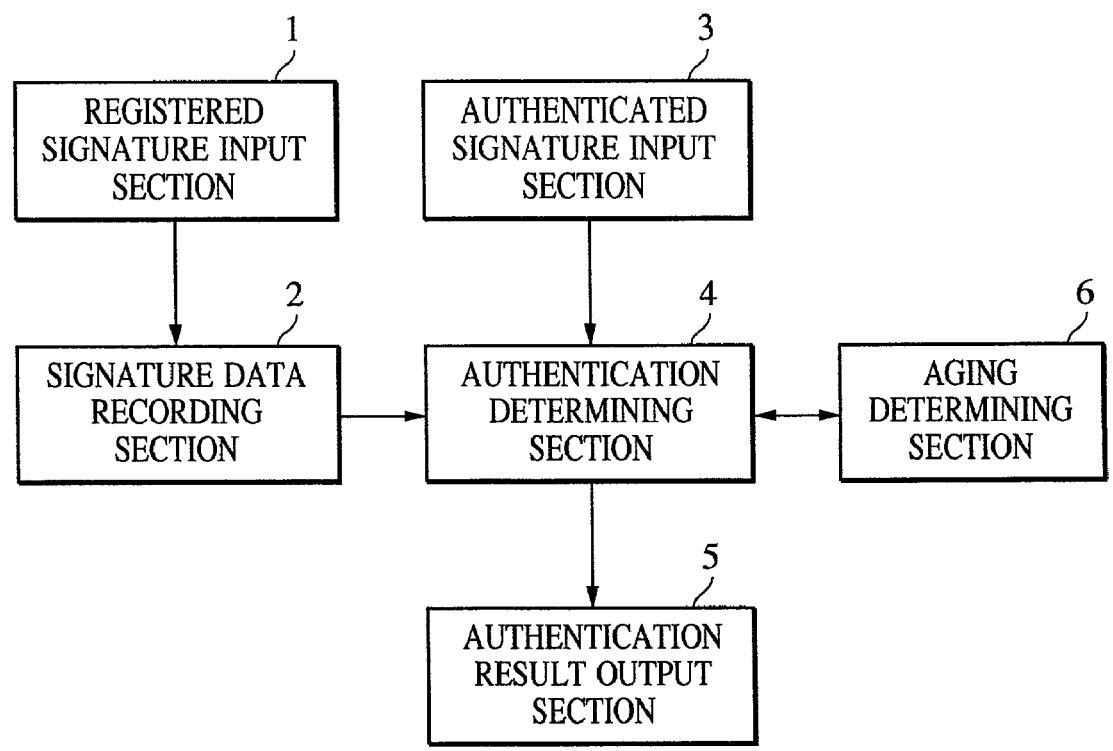
FIG. 1 is a schematic block diagram of a signature authenticating apparatus.

FIG. 1 is a schematic block diagram of processing carried out in the CPU 1201 of the signature authenticating apparatus of this embodiment. Registration of signature data used for signature authentication is accomplished by a user inputting signature data to be registered from a registered signature input section 1 using the digitizer 1202 and by recording the entered signature data in a signature data recording section 2. Data registration for signature authentication is thus completed.

In the processing, upon initiation of signature authentication for identifying that the signer is a person registered, as determined from the entered signature data for authentication, the signature data for authentication are entered by using the digitizer from an authentication signature input section 3. The entered signature data for authorization are sent to an authentication determining section 4. The authentication determining section 4 collates the signature data for authentication acquired from the authentication signature input section 3 with the registered signature data acquired from the signature data recording section 2 to calculate the degree of agreement (evaluation value). An aging determining section 6 determines whether or not aging has occurred. The authentication determining section 4 determines whether or not the case is a successful authentication from the evaluation value thus calculated and the result of determination by the aging determining section, and outputs the result of determination from an authentication result output section 5.

Figure 2:
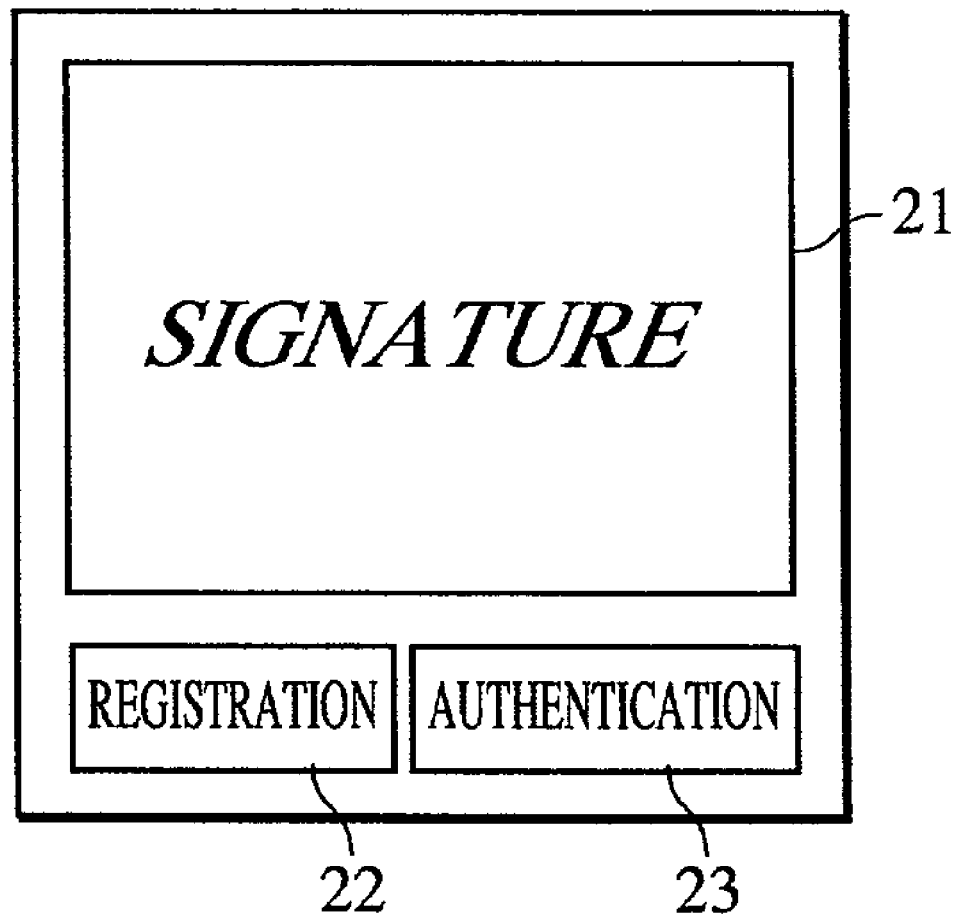
FIG. 2 illustrates an example of input and output.

FIG. 2 illustrates an example of input and output in this embodiment. In this embodiment, the registered signature input section 1, the authentication signature input section 3, and the authentication result output section 5 are unified by an input/output integrated type device (e.g., a digitizer and a liquid crystal display are provided one on top of the other). The user gives his/her signature with a pen on an input/output screen 21, and performs registration of the signature data for registration by pressing a registration button 22, whereby the signature is registered in the signature data recording section 2. In this embodiment, input coordinate data acquired from the digitizer are time-serially accumulated for use as the signature data.

When the user accesses the apparatus of the invention after registration of the signature data for registration in the signature data recording section 2, in order to show that he or she is a proper user, the user first gives a signature with a pen on the input/output screen 21, and presses the authentication button 23. The authentication determining section 4 compares the entered signature data for authentication with the registered signature data stored in the signature data recording section 2. In this embodiment, coordinate data streams of both the entered and the registered signature data are evaluated by a general matching method known as DP (Dynamic Programming) matching, to generate an evaluation value so that complete agreement between the two is represented by 0, and a larger difference between them is expressed by a larger integer value. It is determined whether or not the thus generated evaluation value is within an allowable range of signature authentication. In this embodiment, the allowable range is within 500. When the evaluation value is over 500, the user is refused from making an access via the authentication result output section 5. When the evaluation value is under 500, the evaluation value data are sent, together with date data, to the aging determining section 6, where a list is prepared on the basis of the data received and stored.

FIG. 3 illustrates an example of a data list prepared by the aging determining section 6 from the data sent by the authentication determining section 4 to the aging determining section 6. The data list comprises a pair of a authentication date 31 and an evaluation value 32 generated by the authentication determining section 4 upon authentication. The first data has the date of the signature registration, with an evaluation value of 0. The data list is prepared from data received from the authentication determining section 4, accumulated and retained by the aging determining section 6.

The aging determining section 6 determines whether or not the current evaluation value of authentication is within a warning range of signature authentication. In this embodiment, the warning range is from 400 to 500. The evaluation value 33 of 450 for the authentication on January 30 is within the warning range.

Figure 4:
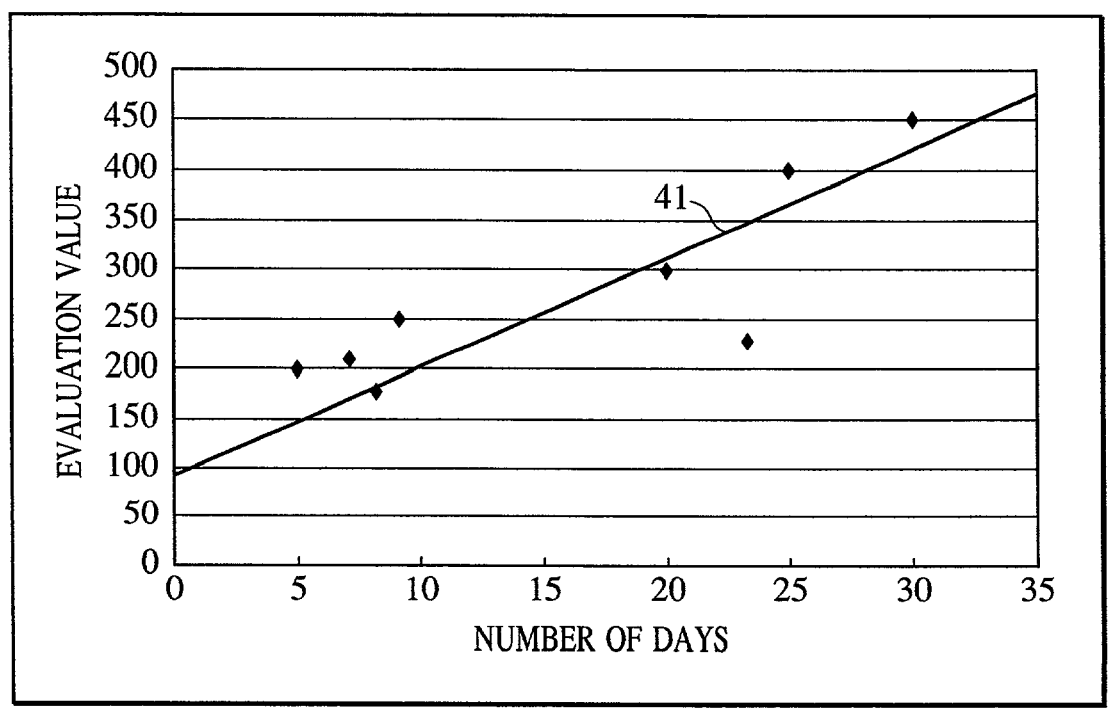
FIG. 4 illustrates an approximate line.

When the evaluation value is within the warning range, the aging determining section 6 determines an approximate line by the least squares method from the list data, as shown in FIG. 4, thereby estimating the date on which the value will be over the allowable range of 500. In the current case, an approximate line 41 is determined as follows:

$$\text{(Evaluation value)}=11\times\text{(number of days)}+90.4$$

The evaluation value is predicted to become over the allowable range on February 6, after a lapse of 37 days. Among the authentication dates of the data list, this represents the longest time lapse. From the dates January 9 and January 20, the longest time lapse between prior authentication dates, the date 11 days ahead is derived as the farthest date on which the next authentication procedure would be followed. Adding 11 days to January 30, the date of the current authentication, gives February 10, which is later than February 6 on which the value is expected to become over 500. This leads to a determination that it is necessary to re-register the signature data.

In this embodiment, in compliance with the determination procedure described above, if re-registration of the signature data is considered necessary, the aging determining section 6 sends a message requesting the authentication determining section 4 to re-register the signature data.

Figure 5:
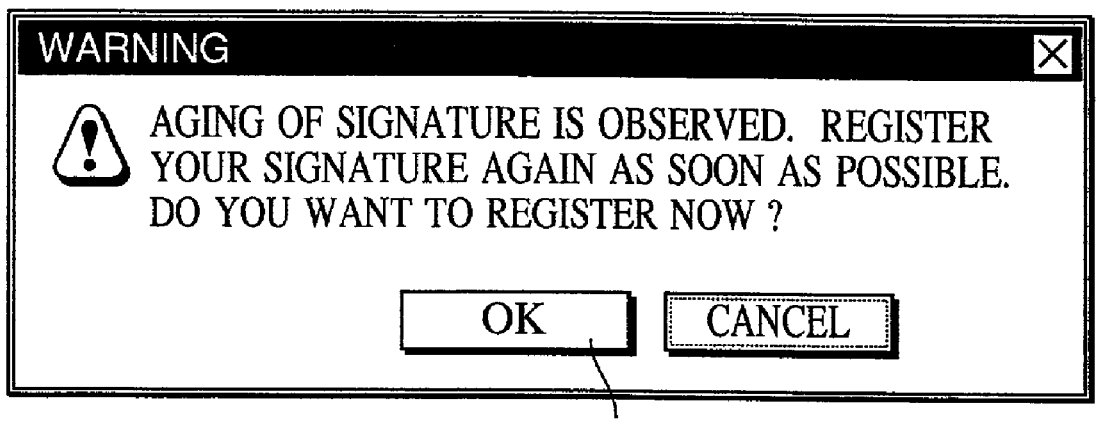
FIG. 5 illustrates a warning message screen for requesting re-registration.

Upon receipt of a request message for re-registration from the aging determining section 6, the authentication determining section 4 issues a message permitting access to this apparatus through the authentication result output section 5 to identify the person in question as a proper user, and displays a warning message requesting re-registration, as shown in FIG. 5, via the authentication result output section 5. In FIG. 5, by pressing an OK button 51, a registered signature input section 1 is called, and the screen is switched over to the signature registration screen (FIG. 2). At this point, by following the signature registration procedure carried out first in this embodiment, the existing registered signature data are erased, and new signature data are registered in the signature data recording section 2. When a cancel button is pressed in FIG. 5, a screen after log-in (such as a menu screen) is displayed without transferring to the signature registration screen.

Figure 6:
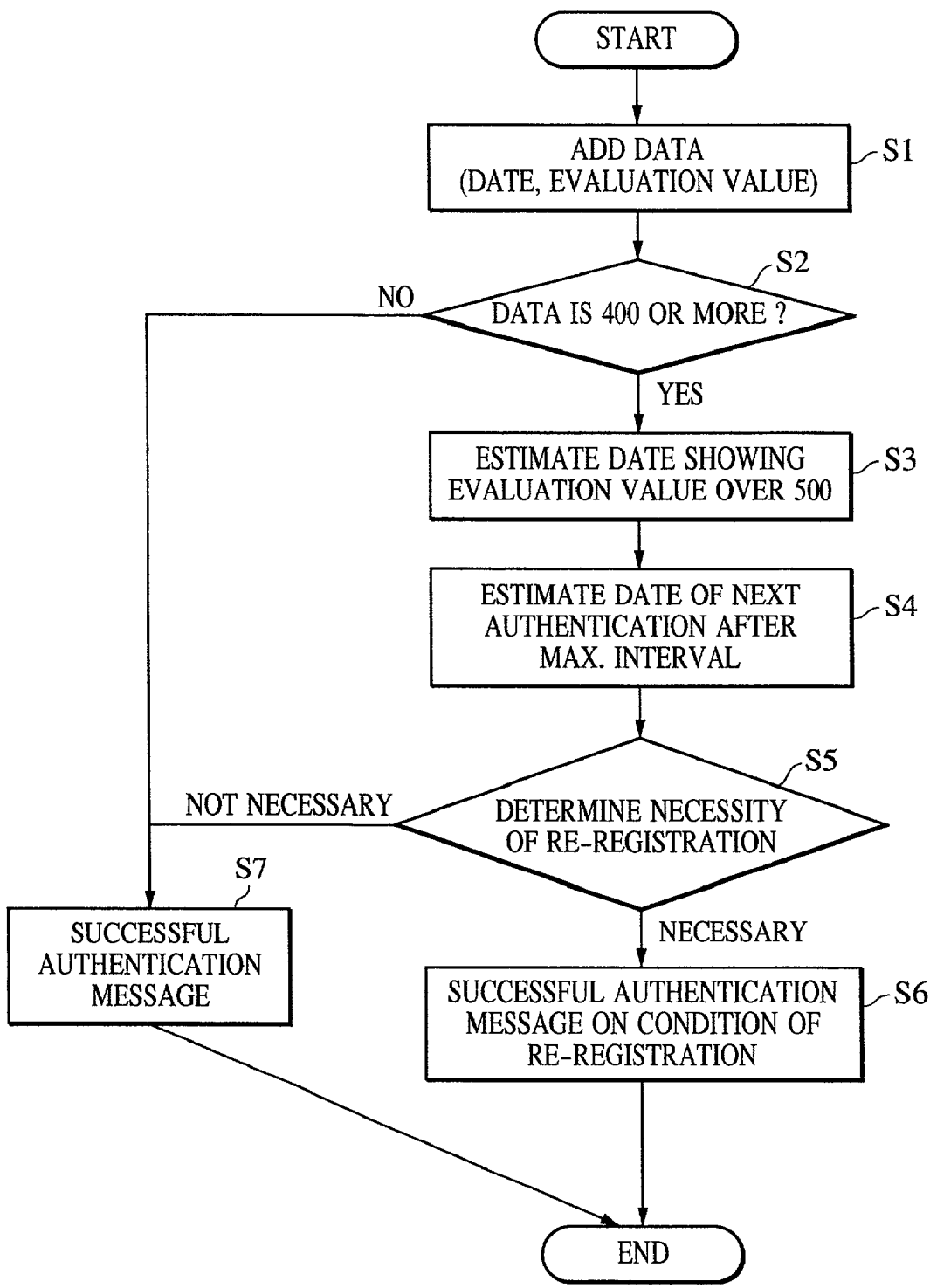
FIG. 6 is a flowchart showing operations of an aging determining section in a first embodiment.

FIG. 6 is a flowchart illustrating operations of the aging determining section 6, from among operations of the apparatus of the invention described above. In step S1, an evaluation value and date data sent from the authentication determining section 4 are added to the data list currently stored. The evaluation value of data sent from the authentication determining section 4 is under 500 since it is sent upon determination that the case is a successful authentication.

Then in step S2, it is determined whether or not the evaluation value sent from the authentication determining section 4 is over 400, which represents a warning range. With a value of under 400, the process advances to step S7, in which an ordinary successful authentication message is sent to the authentication determining section 4, and processing in the aging determining section 6 is completed. On the other hand, when the evaluation value received from the authentication determining section 4 is over 400, the process goes to step S3, and a date on which the evaluation value is predicted to become over 500 is estimated on the basis of the evaluation value data list previously prepared and stored. Then in step S4, the latest date on which the next run of the authentication procedure is expected to occur is estimated on the basis of the data list.

In step S5, it is determined whether or not re-registration of signature data is necessary from the results of steps S3 and S4, by comparing the latest date for the next authentication and the date on which the evaluation value becomes over 500. If re-registration is necessary, the process proceeds to step S7, and if re-registration is not necessary, to step S6. In step S6, the successful authentication message with a re-registration message is sent to the authentication determining section 4, and processing in the aging determining section 6 is completed.

In this embodiment, a DP matching is adopted as a signature matching method, the straight line approximation by the least squares method is adopted for estimating a date on which the value becomes over the allowable range, and the date upon the lapse of the longest interval between the last two authentications is adopted as the next date of the authentication procedure. However, any other methods may be adopted so far as signature matching, estimation of a date on which the evaluation value becomes over the allowable range and estimation of the date of the next authentication procedure can be properly carried out.

Apart from the aforementioned embodiment, aging may be handled by any of the following methods: a method of requesting re-registration upon the lapse of a certain number of days after the first run of signature registration; a method of requesting re-registration after the lapse of a certain number of days from the date of the last signature authentication; a method of sending data to the aging determining section 4 and accumulating these data in cases where the authentication determining section 4 refuses access (in the case of an evaluation value of over 500), and requesting re-registration when user authentication fails during a certain period of time or more than a certain number of times during the same period and then succeeds in authentication; and a method of requesting re-registration when the ratio of failed authentications increases with time.

Second Embodiment

Figure 7:
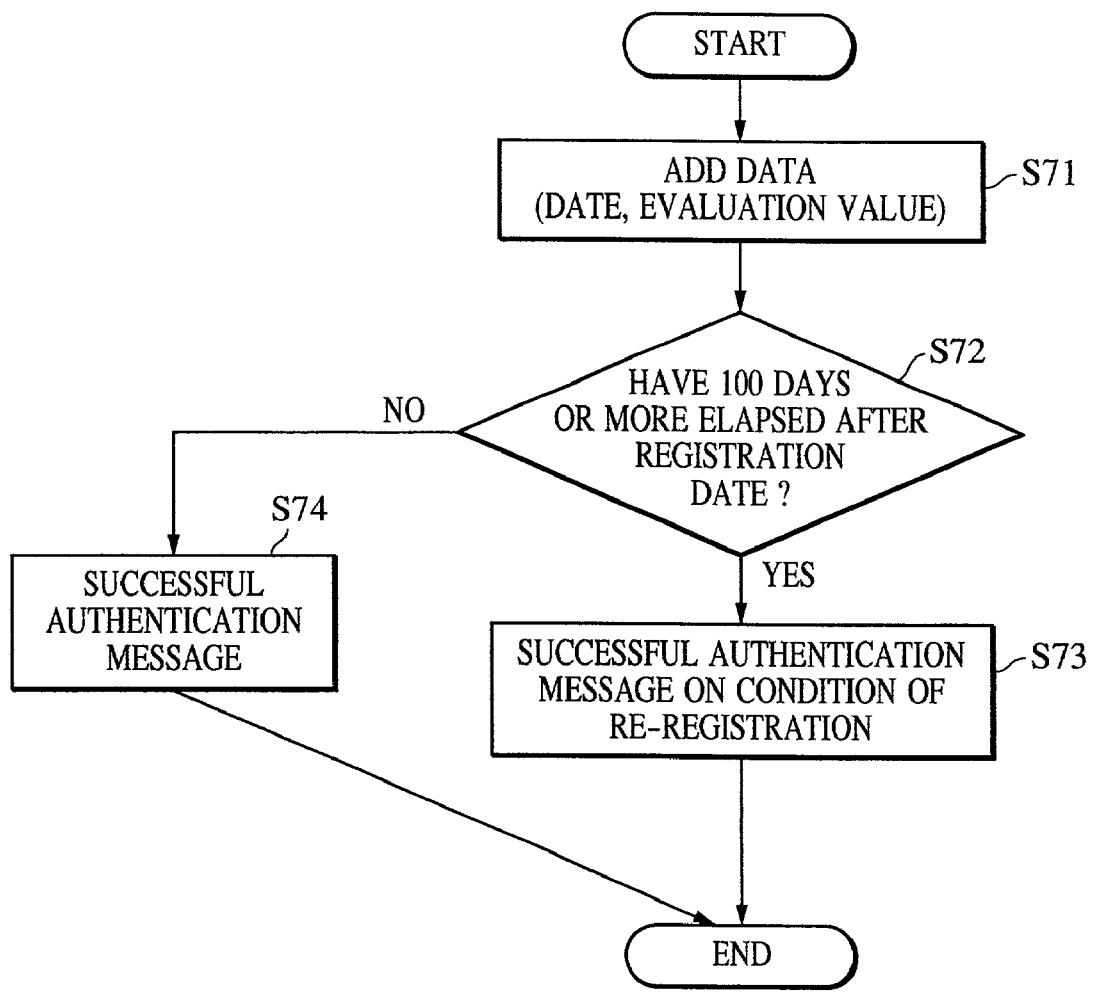
FIG. 7 is a flowchart showing operations of an aging determining section in a second embodiment.

FIG. 7 is a flowchart illustrating operations of the aging determining section 6 in the processing of requesting re-registration after the lapse of a certain number of days from the date of the first signature registration.

In step S71, the evaluation value and date data sent from the authentication determining section 4 are added to the data list currently retained. Then in step S72, it is determined whether or not the date received from the authentication determining section 4 is a date after the lapse of at least a certain number of days from the first signature data registration date. In this embodiment, it is determined whether or not more than 100 days have elapsed. If the time lapse is under 100 days, an ordinary authentication message is sent to the authentication determining section 4 in step S74, and the processing at the aging determining section 6 is completed. If the time lapse is over 100 days, on the other hand, the authentication message is sent with a re-registration message to the authentication determining section 4 in step S73, and the processing at the aging determining section 6 is completed.

Third Embodiment

Figure 8:
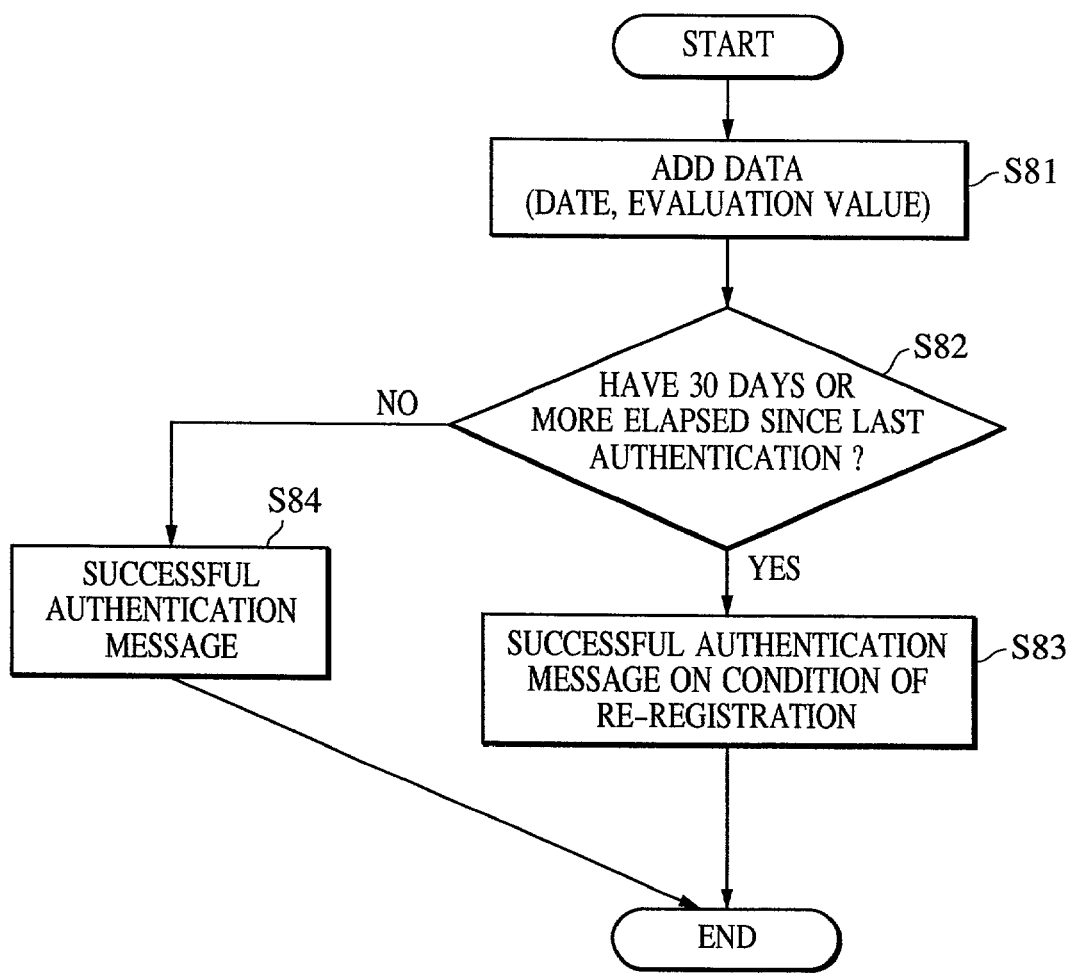
FIG. 8 is a flowchart showing operations of an aging determining section in a third embodiment.

FIG. 8 is a flowchart illustrating operations of the aging determining section 6 in the processing of requesting re-registration after the lapse of a certain number of days from the last date of signature authentication.

First in step S81, the evaluation value and date data sent from the authentication determining section 4 are added to the data list currently retained. Then in step S82, it is determined whether or not the date sent from the authentication determining section 4 is a date after the lapse of at least a certain number of days from the date of the last authentication. In this embodiment, it is determined if more than 30 days have elapsed. If the time lapse is under 30 days, an ordinary authentication message is sent to the authentication determining section 4 in step S84, and the processing in the aging determining section 6 is completed. If the time lapse is more than 30 days, an authentication message is sent with a re-registration request message to the authentication determining section 4 in step S83, and the processing in the aging determining section 6 is completed.

Fourth Embodiment

Figure 9:
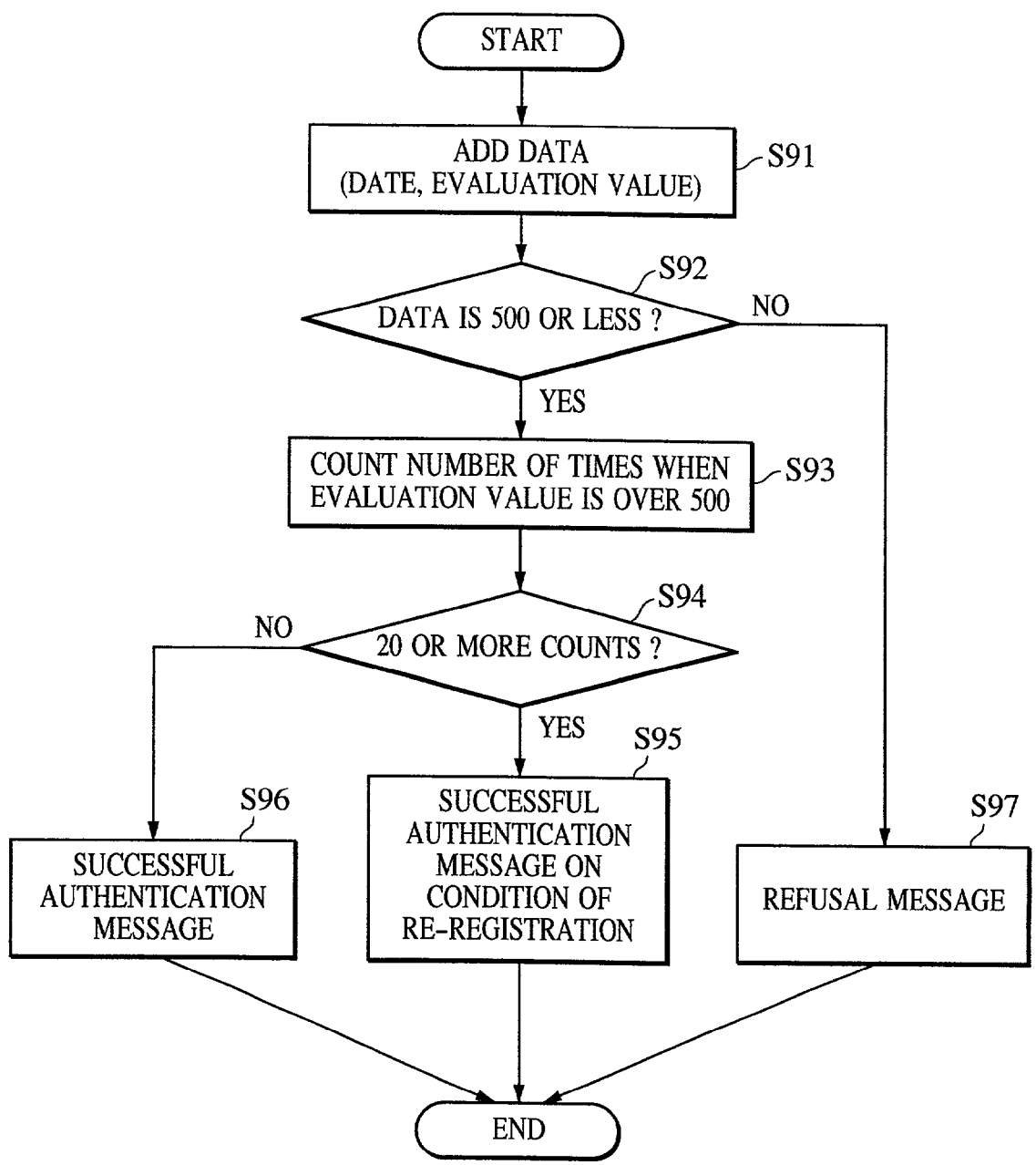
FIG. 9 is a flowchart showing operations of an aging determining section in a fourth embodiment.

FIG. 9 is a flowchart illustrating operations of the aging determining section 6 in the processing of requesting re-registration upon a successful authentication after more than a certain number of authentication failures.

First in step S91, an evaluation value and date data sent from the authentication determining section 4 are added to the list data currently stored. In this embodiment, data are sent from the authentication determining section 4 even when the evaluation value is over 500, exceeding the allowable range of authentication. Then in step S92, it is determined whether or not the evaluation value received from the authentication determining section 4 is under 500, which represents the allowable range of authentication. If the value is over 500, a refusal message is sent to the authentication determining section 4 in step S97, and the processing in the aging determining section 6 is completed. If the evaluation value sent from the authentication determining section 4 is under 500, on the other hand, the number of cases where the evaluation value is over 500 is counted from the stored past evaluation value data list in step S93. For this counting, the number of cases where the evaluation value is over 500 during a period up to a prescribed number of days prior to the current point in time may be counted. In step S94, depending upon whether or not the result of the count is over a prescribed threshold value, it is determined whether or not re-registration is necessary. If re-registration is not necessary, the process proceeds to step S96, and if re-registration is necessary, to step S95. In this embodiment, this determination is based on whether the count in step S93 is over 20 or not. If the count is under 20, the process advances to step S96, and an ordinary authentication message is sent to the authentication determining section 4, thus completing the processing in the aging determining section 6. If the count is over 20, an authentication message with a re-registration request message is sent to the authentication determining section 4 in step S95, and the processing in the aging determining section 6 is completed.

Fifth Embodiment

Figure 10:
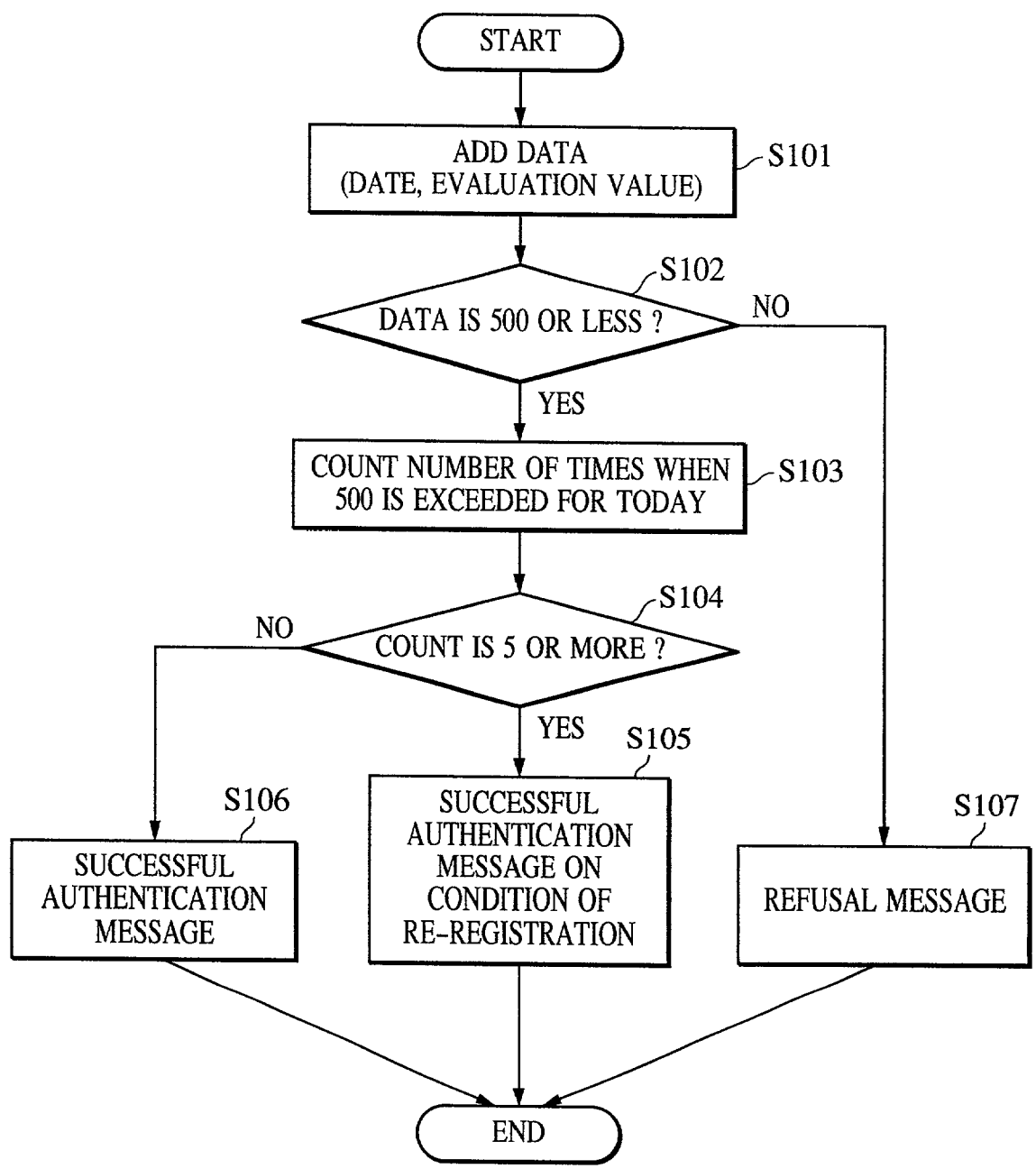
FIG. 10 is a flowchart showing operations of an aging determining section in a fifth embodiment.

FIG. 10 is a flowchart illustrating operations of the aging determining section 6 in the processing of requesting re-registration upon a successful authentication after more than a certain number of times of failure in authentication during the same period.

First in step S101, an evaluation value and date data sent from the authentication determining section 4 are added to the currently stored list data. In this embodiment, data are sent from the authentication determining section 4 even when the evaluation value is over 500, exceeding the allowable range. Then in step S102, it is determined whether or not the evaluation value received from the authentication determining section 4 is under 500, the allowable range of authentication. If the evaluation value is over 500, a refusal message is sent to the authentication determining section 4 in step S107, and the processing in the aging determining section 6 is completed. If the evaluation value sent from the authentication determining section 4 is under 500, the number of cases where the evaluation value is over 500 on the same date as the date currently sent from the authentication determining section 4 is counted from the stored past evaluation value list in step S103. In step S104, it is determined whether or not re-registration is necessary from the number of times obtained as a result of counting. If re-registration is not necessary, the process goes to step S106, and if re-registration is necessary, to step S105. In this embodiment, it is determined whether or not the count is over 5. If the count is under 5, an ordinary authentication message is sent to the authentication determining section 4 in step S106, and the processing at the aging determining section 6 is completed. If the count is over 5, an authentication message with a re-registration request message is sent to the authentication determining section 4 in step S105, and the processing in the aging determining section 6 is completed.

Sixth Embodiment

Figure 11:
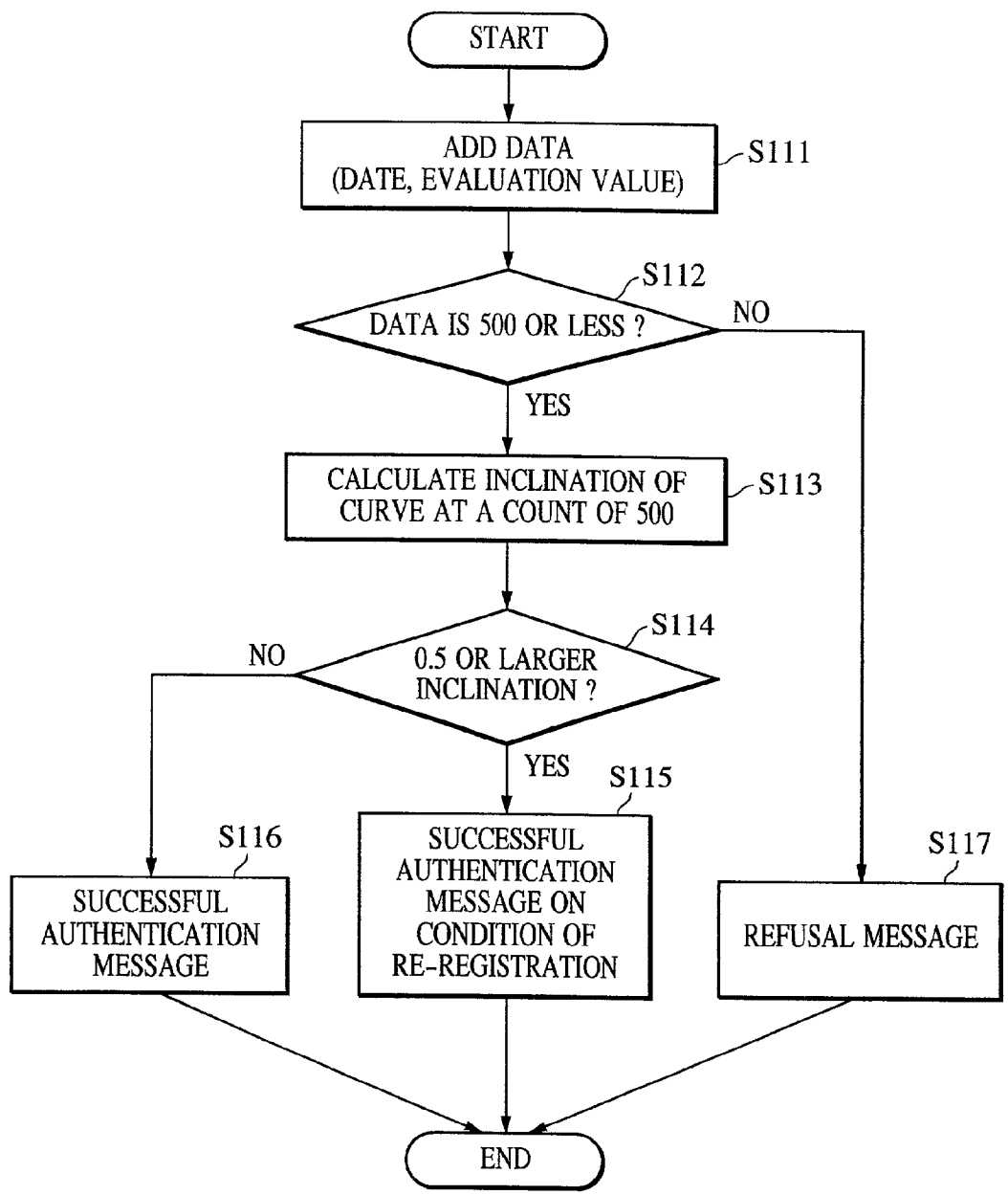
FIG. 11 is a flowchart showing operations of an aging determining section in a sixth embodiment.

FIG. 11 is a flowchart illustrating operations of the aging determining section 6 in the processing requesting re-registration when the ratio of cases of failed authentication increases with the lapse of time.

First in step S111, an evaluation value and date data sent from the authentication determining section 4 are added to the currently stored data list. In this embodiment, data are sent from the authentication determining section 4 even when the evaluation value is over 500, exceeding the allowable range of authentication. Then in step S112, it is determined whether or not the evaluation value received from the authentication determining section 4 is over 500, the allowable range of authentication. If the value is over 500, a refusal message is sent to the authentication determining section 4 in step S117, and the processing in the aging determining section 6 is completed. When the evaluation value sent from the authentication determining section 4 is under 500, on the other hand, a graph is conceived, in step S113, which is made by plotting the number of runs in which the evaluation value was over 500 on the ordinate, and a mean inclination of the graph is determined by means of straight line approximation based on the least squares method from the stored past evaluation value data list. If this inclination is larger than 0, the number of runs with an evaluation value of over 500 may be considered to be increasing. In step S114, it is determined whether re-registration is necessary or not from whether or not the value of this inclination is over a prescribed threshold value. If re-registration is not necessary, the process proceeds to step S116, and if not, to step S115. In this embodiment, it is determined whether or not the inclination is over 0.5. If the inclination is under 0.5, an ordinary authentication message is sent to the authentication determining section 4 in step S116, and the processing in the aging determining section 6 is completed. If the inclination is over 0.5, an authentication message with a re-registration request message is sent to the authentication determining section 4 in step S115, and the processing in the aging determining section 6 is completed.

Seventh Embodiment

Furthermore, when signature data determined to show a case of successful authentication in the last run are recorded previously in addition to the registered signature data initially registered in the signature data recording section 2, and a signature is newly entered for signature authentication, the authentication determining section 4 compares the same with the both signature data recorded in the signature data recording section 2, calculates a degree of agreement (evaluation value) between them, and if any of the evaluation values satisfies a prescribed criterion, the case is determined to be a successful authentication. To a signature authenticating apparatus having such a learning function, the processes corresponding to the aforementioned flowcharts of FIGS. 6 to 11 are applicable. In this case, the evaluation value derived from the comparison of the entered signature and the registered signature data initially registered is sent to the aging determining section 6. In the aging determining section 6, the same processing as any of the flowcharts of FIGS. 6 to 11 is executed. If it is determined that re-registration is necessary, a re-registration request message to instruct re-registration of the registered signature data initially registered is sent to the authentication determining section 4, and a dialog as shown in FIG. 5 is displayed.

In a signature authenticating apparatus having such a learning function, signature data of the last run of successful authentication may sometimes be largely different from the initially registered signature data, thus impairing reliability of whether or not the person in question is really a proper user. According to this embodiment, reliability of such identity can be maintained by re-registering the signature data at certain intervals.

Eighth Embodiment

Figure 13:
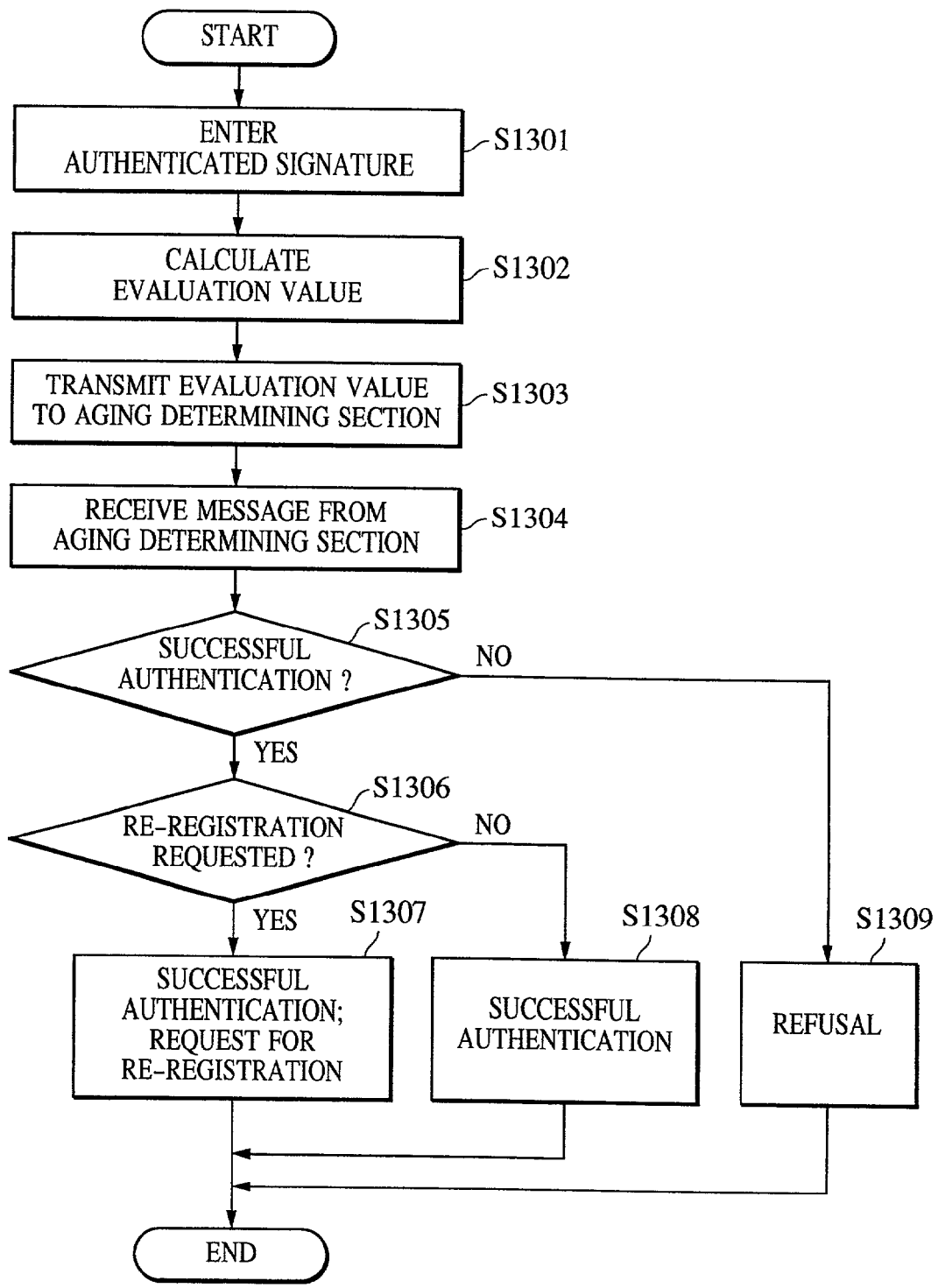
FIG. 13 is a flowchart showing operations of an authentication determining section.

FIG. 13 is a flowchart illustrating operations of the authentication determining section 4 from among the operations of the present apparatus explained by means of the aforementioned first to seventh embodiments. In step S1301, upon input of an authentication signature from the authentication signature input section 3, the entered signature for authentication is compared with the signature data recorded in the signature data recording section to calculate an evaluation value in step S1302. In step S1303, the resultant evaluation value is transmitted to the aging determining section 6, and in step S1304, a determination is received from the aging determining section 6. In step S1305, it is determined whether or not the case is a successful authentication from the evaluation value. If authentication fails, a refusal message is issued to the authentication result output section 5 in step S1309. If successful, it is determined whether or not re-registration is to be requested in response to the determination from the aging determining section 6 in step S1306. If re-registration is necessary, a re-registration request message is issued, together with a successful authentication message. If not, a successful authentication message is issued in step S1308.

In the first to third embodiments, however, the evaluation value transmitted in step S1303 should satisfy a prescribed criterion (evaluation value of under 500). If the prescribed criterion is not satisfied, steps S1303 to 1304 are skipped, and the process proceeds from step S1305 to step S1309.

In the fourth to sixth embodiments, the evaluation value to be transmitted in step S1303 should be transmitted irrespective of satisfaction or not of the prescribed criterion.

In the seventh embodiment, the evaluation value to be transmitted in step S1303 is an evaluation value derived from comparison with the initially registered signature data, and the authentication signature data entered in steps S1307 and 1308 are controlled so as to record the data in place of the signature data of the last run recorded in the signature data recording section 2.

Ninth Embodiment

In a server client system comprising an information processing unit serving as a client for entering a signature and a server authenticating the entered signature, it is possible to conduct the same signature authentication as in the first to eighth embodiments. In this case, upon receipt of registered signature data from the client via a communication interface 1204 shown in FIG. 12, the server stores the data as registered signature data in the signature data recording section 2. When the user executes a signature authenticating operation in the client, the signature data entered from the client are transmitted to the server. The server receives the authentication signature data from the client, and as in the aforementioned first to eighth embodiments, a determination is performed in the authentication determining section 4 and the aging determining section 6, respectively. The authentication result output section 5 notifies the result of authentication (a successful authentication message, successful authentication message with a re-registration request message, or refusal message) to the client via the communication interface. In this case, the communication interface serves to exchange signature data and authentication result data.

According to the aforementioned first to ninth embodiments, it is possible, when a signature suffers from aging, to prevent circumstances suddenly making it impossible to accomplish authentication.

By conducting correction at certain intervals of time, it is possible to prevent deterioration of reliability of identity.

Also, in signature authentication in a client-server system, it is possible to cope with aging. Except as otherwise disclosed herein, the various components shown in outline or in block form in the Figures are individually well known and their internal construction and operation are not critical either to the making or using of this invention or to a description of the best mode of the invention.

While the present invention has been described with reference to what are presently considered to be the preferred embodiments, it is to be understood that the invention is not limited to the disclosed embodiments. On the contrary, the invention is intended to cover various modifications and equivalent arrangements included within the spirits and scope of the appended claims. The scope of the following claims is to be accorded the broadest interpretation so as to encompass all such modifications and equivalent structures and functions.

What is claimed is:

1. A handwritten signature authenticating apparatus comprising:
   signature data storing means for storing registered handwritten signature data used for signature authentication;
   authentication determining means for calculating an evaluation value by comparing entered handwritten signature data with the registered handwritten signature data stored in said signature data storing means, and determining whether or not authentication is successful by on the basis of the calculated evaluation value; and
   aging determining means for determining whether or not aging of entered handwritten signature data has occurred on the basis of the evaluation value calculated by said authentication determining means.

2. A handwritten signature authenticating apparatus according to claim 1, further comprising:
   data list storing means for storing evaluation values calculated in the past, together with dates, as a data list; and
   adding means for adding the evaluation value calculated by said authentication determining means to said data list;
   wherein said aging determining means determines whether or not aging has occurred on the basis of the data list after the calculated evaluation value is added to the data list.

3. A handwritten signature authenticating apparatus according to claim 1, wherein said aging determining means determines whether aging has occurred when the authentication by said authentication determining means is successful.

4. A handwritten signature authenticating apparatus according to claim 1, further comprising requesting means which, when aging is determined to have occurred by said aging determining means, requests re-registration of said registered handwritten signature data.

5. A handwritten signature authenticating apparatus according to claim 1, further comprising warning output means which, when aging is determined to have occurred by said aging determining means, issues a warning message.

6. A handwritten signature authenticating apparatus according to claim 1, wherein said aging determining means determines aging to have occurred when a result of a calculation calculated on the basis of said evaluation value is over a prescribed criterion.

7. A handwritten signature authenticating apparatus according to claim 2, wherein said aging determining mans calculates an estimated evaluation value for the next run of a handwritten signature authentication process, on the basis of said data list, and determines aging to have occurred when said estimated evaluation value is over a prescribed criterion.

8. A handwritten signature authenticating apparatus according to claim 7, wherein a projected date on which the next run of a handwritten signature authentication process will be carried out is determined on the basis of the dates stored as said data lists.

9. A handwritten signature authenticating apparatus according to claim 1, wherein said aging determining means determines whether or nor a prescribed period of time has elapsed since storage of said registered handwritten signature data in said signature data storing means, and when said prescribed period of time is determined to have elapsed, determines aging to have occurred.

10. A handwritten signature authenticating apparatus according to claim 2, wherein said aging determining means calculates a period of time elapsed since the last determination of a successful authentication to a current determination of a successful authentication, and when said period of time is determined to be over a prescribed period of time, determines aging to have occurred.

11. A handwritten signature authenticating apparatus according to claim 2, wherein said aging determining means calculates a number of runs in which an evaluation value corresponds to a failed authentication, and when said number of runs is over a prescribed number of runs, determines aging to have occurred.

12. A handwritten signature authenticating apparatus according to claim 2, wherein said aging determining means calculates a number to times of addition of evaluation values representing failed authentications to the data list within a prescribed period, and when said number of times is over a prescribed number of times, determines aging to have occurred.

13. A handwritten signature authenticating apparatus according to claim 2, wherein said aging determining means calculates a rate of change in a number of stored evaluation values representing cases of failed authentication, from dates and evaluation values representing failed authentications on the basis of said data list, and when said rate of change is over a prescribed value, said aging determining means determines aging to have occurred.

14. A handwritten signature authenticating apparatus according to claim 1, wherein:
   handwritten signature data stored in said signature data storing means includes initial handwritten signature data initially registered and last handwritten signature data determined to be successful in the last authentication;
   said authentication determining means compares said entered handwritten signature data with said initial handwritten signature data and said last handwritten signature data to calculate respective evaluation values, thereby determining whether or not the current run is a successful authentication; and
   said aging determining means determines whether or not aging has occurred on the basis of evaluation values calculated from comparison of said entered handwritten signature data with said initial handwritten signature data.

15. A handwritten signature authenticating apparatus according to claim 1, wherein said entered handwritten signature data are transmitted from a client via a network.

16. A handwritten signature authenticating method comprising:
   an authentication determining step of calculating an evaluation value by comparing entered handwritten signature data with registered handwritten signature data stored in signature data storing means, and determining whether or not authentication is successful on the basis of the calculated evaluation value; and
   an aging determining step of determining whether or not aging of entered handwritten signature data has occurred on the basis of the evaluation value calculated in said authentication step.

17. A handwritten signature authenticating method according to claim 16, further comprising:
   a data list storing step of storing evaluation values calculated in the past, together with dates thereof, as a data list in data list storing means; and
   an adding step of adding the evaluation value calculated in said authentication determining step to said data list;
   wherein, in said aging determining step, it is determined whether or not aging has occurred on the basis of the data list after adding a current evaluation value to the data list.

18. A handwritten signature authenticating method according to claim 16, wherein said aging determining step determines whether or not aging has occurred when the authentication in said authentication determining step is successful.

19. A handwritten signature authenticating method according to claim 16, further comprising a requesting step of requesting, when aging is determined to have occurred in said aging determining step, re-registration of said registered handwritten signature data.

20. A handwritten signature authenticating method according to claim 16, further comprising a warning issuing step of issuing a warning message when aging is determined to have occurred in said aging determining step.

21. A handwritten signature authenticating method according to claim 16, wherein, in said aging determining step, aging is determined to have occurred when the result of a calculation made on the basis of said evaluation data is over a prescribed criterion.

22. A handwritten signature authenticating method according to claim 17, wherein, in said aging determining step, aging is determined to have occurred when an evaluation value predicted for the next run of a handwritten signature authentication process, calculated on the basis of aid data list, is over a prescribed criterion.

23. A handwritten signature authenticating method according to claim 22, wherein a projected date on which the next handwritten signature authentication process is expected to be performed is determined on the basis of the dates stored in said data list.

24. A handwritten signature authenticating method according to claim 16, wherein, in said aging determining step, it is determined whether of not a prescribed period of time has elapsed since storage of said registered handwritten signature data in said signature data storing step, and when said prescribed period of time is determined to have elapsed, aging is determined to have occurred.

25. A handwritten signature authenticating method according to claim 17, wherein, in said aging determining step, a time lapse from the last determination of successful authentication until a current determination of successful authentication is calculated on the basis of said data list, and when said time lapse is determined to be over a prescribed period of time, aging is determined to have occurred.

26. A handwritten signature authenticating method according to claim 17, wherein, in said aging determining step, the number of times of addition, to the data list, of evaluation values corresponding to failed authentications is calculated on the basis of said data list, and aging is determined to have occurred when said number of times is over a prescribed number of times.

27. A handwritten signature authenticating method according to claim 17, wherein, in said aging determining step, the number of times of addition, to the data list, of evaluation values corresponding to failed authentications within a prescribed period of time to the data list is calculated on the basis of the data list, and aging is determined to have occurred when said number of times is over a prescribed number of times.

28. A handwritten signature authenticating method according to claim 17, wherein, in said aging determining step, the rate of change in the number of failed authentications is calculated from dates and evaluation values representing failed authentications on the basis of said data list, and aging is determined to have occurred when said rate of change is over a prescribed threshold value.

29. A handwritten signature authenticating method according to claim 16, wherein the handwritten signature data stored in said signature data storing means include initially registered initial handwritten signature data and the last handwritten signature data determined to represent a successful authentication in the last authentication; and in said aging determining step, it is determined whether or not aging has occurred on the basis of the evaluation value calculated from comparing said entered handwritten signature data with said initial handwritten signature data.

30. A handwritten signature authenticating method according to claim 16, wherein said entered handwritten signature data are transmitted from a client via a network.

31. A handwritten signature authenticating program for a computer comprising:

an authentication determining step of calculating an evaluation value by comparing entered handwritten signature data with registered handwritten signature data stored in signature data storing means, and determining whether or not authentication is successful on the basis of the calculated evaluation value; and an aging determining step of determining whether or not aging of the-registered entered handwritten signature data has occurred on the basis of the evaluation value calculated in said authentication determining step.

32. A handwritten signature authenticating program according to claim 31 further comprising:

a data list storing step of storing evaluation values calculated in the past, together with dates thereof as data list in data list storing means; and an adding step of adding the evaluation value calculated in said authentication determining step to said data list;

wherein, in said aging determining step, it is determined whether or not aging has occurred on the basis of the data list after adding a current evaluation value to the data list.

33. A handwritten signature authenticating program according to claim 31, wherein said aging determining step determines whether or not aging has occurred when the authentications in said authentication determining step is successful.

34. A handwritten signature authenticating program according to claim 31, further comprising a requesting step of requesting, when aging is determined to have occurred in said aging determining step, re-registration of said registered handwritten signature data.

35. A handwritten signature authenticating program according to claim 31, further comprising a warning issuing step of issuing a warning message when aging is determined to have occurred in said aging determining step.

36. A handwritten signature authenticating program according to claim 31, wherein, in said aging determining step, aging is determined to have occurred when the result of a calculation made on the basis of said evaluation data is over a prescribed criterion.

37. A handwritten signature authenticating program according to claim 32, wherein, in said aging determining step, aging is determined to have occurred when an evaluation value predicted for the next run of a handwritten signature authentication process, calculated on the basis of said data list, is over a prescribed criterion.

38. A handwritten signature authenticating program according to claim 37, wherein a projected date on which the next handwritten signature authentication process is expected to be performed is determined to on the basis of the dates stored in said data list.

39. A handwritten signature authenticating program according to claim 31, wherein, in said aging determining step, it is determined whether or not a prescribed period of time has elapsed since storage of said registered handwritten signature data in said signature data storing step, and when said prescribed period of time is determined to have elapsed, aging is determined to have occurred.

40. A handwritten signature authenticating program according to claim 32, wherein, in said aging determining step, a time lapse from the last determination of successful authentication until a current determination of successful authentication is calculated on the basis of said data list, and when said time lapse is determined to be over a prescribed period of time, aging is determined to have occurred.

41. A handwritten signature authenticating program according to claim 32, wherein, in said aging determining step, the number of times of addition, to the data list, of evaluation values corresponding to failed authentication is calculated on the basis of said data list, and aging is determined to have occurred when said number of times is over a prescribed number of times.

42. A handwritten signature authenticating program according to claim 32, wherein, in said aging determining step, the number of times of addition, to the data list, of evaluation values corresponding to failed authentications within a prescribed period of time to the data list is calculated, and aging is determined to have occurred when said number of times is over a prescribed number of times.

43. A handwritten signature authenticating program according to claim 32, wherein, in said aging determining step, rate of change in the number failed authentications is calculated from dates and evaluation values representing failed authentications of the basis of said data list, and aging is determined to have occurred when said rate of change is over a prescribed threshold value.

44. A handwritten signature authenticating program according to claim 31, wherein the handwritten signature data stored in said signature data storing means include initially registered initial handwritten signature data and the last handwritten signature data determined to represent a successful authentication in the last authentication; and in said aging determining step, it is determined whether or not aging has occurred on the basis of the evaluation value calculated from comparing said entered handwritten signature data with said initial handwritten signature data.

45. A handwritten signature authenticating program according to claim 31, wherein said entered handwritten signature data are transmitted from a client via a network.

46. A computer readable storage medium storing the software codes for a computer to execute steps claimed in claim 31.

* * * * *

UNITED STATES PATENT AND TRADEMARK OFFICE
CERTIFICATE OF CORRECTION

PATENT NO. : 7,035,406 B2  Page 1 of 1
APPLICATION NO. : 09/865451
DATED : April 25, 2006
INVENTOR(S) : Hatsuo Machida et al.

It is certified that error appears in the above-identified patent and that said Letters Patent is hereby corrected as shown below:

COLUMN 4
Line 15, "of a" should read --of an--.

COLUMN 10
Line 17, "by on" should read --on--.
Line 54, "mans" should read --means--.

COLUMN 11
Line 20, "to times" should read --of times--.

COLUMN 12
Line 35, "aid data" should read --said data--.
Line 43, "whether of" should read --whether or--.

COLUMN 13
Line 34, "the-registered" should be deleted.
Line 51, "authentications" should read --authentication--.

COLUMN 14:
Line 42, "number" should read --number of--.

Signed and Sealed this

Eleventh Day of September, 2007

JON W. DUDAS
*Director of the United States Patent and Trademark Office*